(12) United States Patent
Kurata et al.

(10) Patent No.: US 8,594,564 B2
(45) Date of Patent: Nov. 26, 2013

(54) COMMUNICATION APPARATUS PERFORMING ELECTROSTATIC COUPLING FORMED BETWEEN AN ELECTRODE UNIT AND A LIVING BODY

(75) Inventors: Masanori Kurata, Kanagawa-ken (JP); Takafumi Ohishi, Kanagawa-ken (JP); Shuichi Obayashi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 441 days.

(21) Appl. No.: 13/051,194

(22) Filed: Mar. 18, 2011

(65) Prior Publication Data
US 2012/0129449 A1 May 24, 2012

(30) Foreign Application Priority Data
Nov. 19, 2010 (JP) ................................ P2010-258419

(51) Int. Cl.
*H04B 5/00* (2006.01)
(52) U.S. Cl.
USPC ......................... 455/41.1; 455/41.2; 455/269
(58) Field of Classification Search
USPC ....................................................... 455/41.1
See application file for complete search history.

(56) References Cited

U.S. PATENT DOCUMENTS

2010/0304671 A1* 12/2010 Hebiguchi et al. ............ 455/41.1
2013/0149961 A1* 6/2013 Mori et al. .................... 455/41.1

* cited by examiner

*Primary Examiner* — Fayyaz Alam
*Assistant Examiner* — David Bilodeau
(74) *Attorney, Agent, or Firm* — White & Case LLP

(57) ABSTRACT

According to an embodiment, the first signal line is provided on the substrate and has one end connected to the communication unit. The coaxial line is provided by a surface side of the substrate and includes second and third signal lines. The third signal line is provided at an outside of the second signal line through a dielectric. One end of the second signal line is connected to the other end of the first signal line. One end of the third signal line is connected to the ground electrode though a via. The electrode unit includes a reference potential electrode and a signal electrode. The signal electrode is provided around the reference potential electrode with a space left in between. The reference potential electrode is connected to the other end of the third signal line whereas the signal electrode is connected to the other end of the second signal line.

20 Claims, 13 Drawing Sheets

COMMUNICATION APPARATUS PERFORMING ELECTROSTATIC COUPLING FORMED BETWEEN AN ELECTRODE UNIT AND A LIVING BODY

CROSS REFERENCE TO RELATED APPLICATION

This application is based upon and claims the benefit of priority from the prior Japanese Patent Application No. 2010-258419, filed on Nov. 19, 2010, the entire contents of which are incorporated herein by reference.

FIELD

The embodiments described hereinbelow relate to a communication apparatus and a communication system.

BACKGROUND

Techniques of human body communication in which communication data is transmitted and received through living bodies such as human bodies have been developed in various fields. For human body communication, a communication apparatus using a human body as a part of the transmission path is provided with two electrodes. One of the two electrodes is a signal electrode connected to a signal line whereas the other is a reference potential electrode connected to a ground potential, having a reference potential, of the communication apparatus. Signal electrodes are coupled to each other mainly through human bodies, whereas reference potential electrodes are coupled to each other mainly through a space and/or the earth ground. With these couplings, the communication apparatus transfers a difference in potential between the signal electrode and the reference potential electrode to the correspondent communication apparatus.

The coupling between the reference potential electrodes through the space and/or the earth ground is affected by the noise from other systems, or a fluctuation in potential of a signal on the human-body surface caused by an unintended coupling to a nearby human body. Accordingly, the reference potential becomes unstable, and the communication quality is impaired.

DETAILED DESCRIPTION

Figure 1:
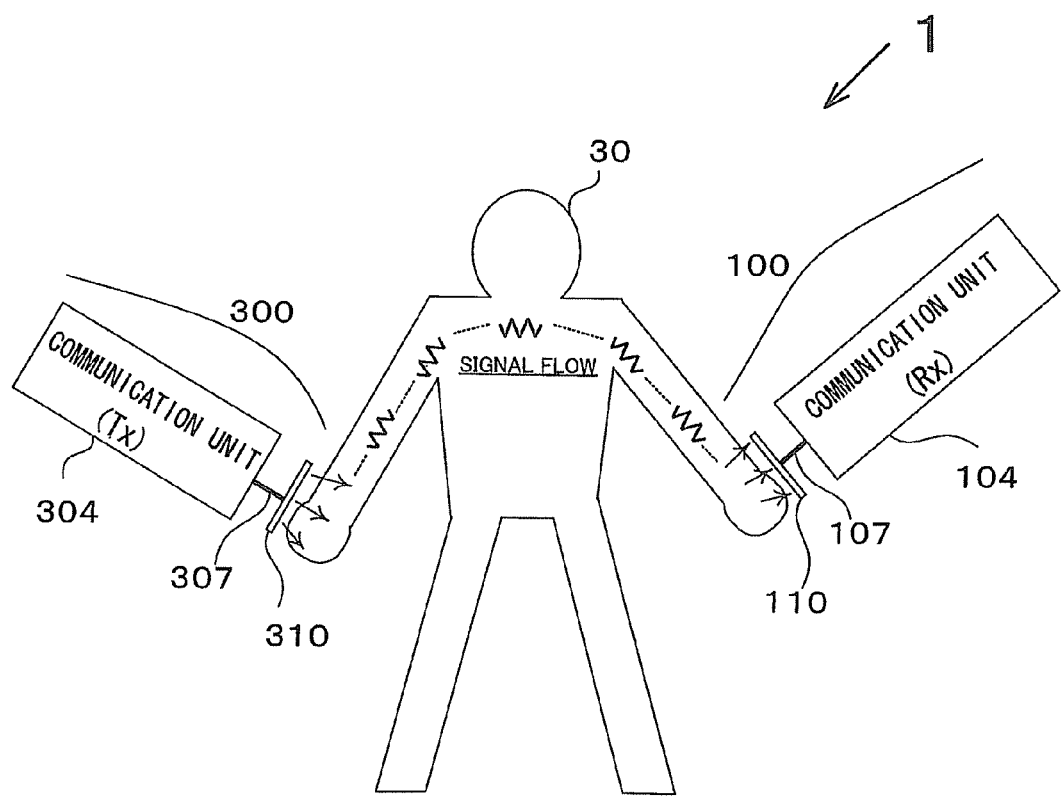
FIG. 1 is a diagram illustrating the configuration of a communication system of a first embodiment.

According to an embodiment, a communication apparatus includes a substrate, a communication unit, a first signal line, a coaxial line, and an electrode unit. The communication apparatus performs data communications by means of electrostatic couplings formed between a living body and electrode units. A ground electrode is provided in the substrate. The communication unit is provided on the substrate. The first signal line is provided on the substrate, and one end of the first signal line is connected to the communication unit. The coaxial line is provided by a surface side of the substrate, and includes a second signal line and a third signal line. The third signal line is provided at an outside of the second signal line through a dielectric. One end of the second signal line is connected to the other end of the first signal line. One end of the third signal line is connected to the ground electrode though a via. The electrode unit includes a reference potential electrode and a signal electrode. The signal electrode has a distance from the reference potential electrode and is provided around the reference potential electrode. The reference potential electrode is connected to the other end of the third signal line whereas the signal electrode is connected to the other end of the second signal line.

According to another embodiment, a communication system includes a first and a second communication apparatuses. In the communication system, the first and the second communication apparatuses perform data communications by means of an electric field formed by a living body. The first communication apparatus includes a first substrate, a first communication unit, a first signal line, a first coaxial line, and a first electrode unit. A first ground electrode is provided in the first substrate. The first communication unit is provided on a first main surface of the first substrate, and transmits data. The first signal line is provided on the first main surface of the first substrate, and one end of the first signal line is connected to the first communication unit. The first coaxial line is provided on the first main surface side of the first substrate, and includes a second signal line and a third signal line. The third signal line is provided at an outside of the second signal line through a dielectric. One end of the second signal line is connected to the other end of the first signal line. One end of the third signal line is connected to the first ground electrode though a via. The first electrode unit includes a first reference potential electrode and a first signal electrode. The first signal electrode has a distance from the first reference potential electrode and is provided around the first reference potential electrode. The first reference potential electrode is connected to the other end of the third signal line whereas the first signal electrode is connected to the other end of the second signal line. The second communication apparatus includes a second substrate, a second communication unit, a fourth signal line, a second coaxial line, and a second electrode unit. A second ground electrode is provided in the second substrate. The second communication unit is provided on a first main surface of the second substrate, and receives data. The fourth signal line is provided on the first main surface of the second substrate, and one end of the fourth signal line is connected to the second communication unit. The second coaxial line is provided on the first main surface of the second substrate, and includes a fifth signal line and a sixth signal line. The sixth signal line is provided at an outside of the fifth signal line through a dielectric. One end of the fifth signal line is connected to the other end of the fourth signal line, and one end of the sixth signal line is connected to the second ground electrode though a via. The second electrode unit includes a second reference potential electrode and a second signal electrode. The second signal electrode has a distance from the second reference potential electrode and is provided around the second reference potential electrode. The second reference potential electrode is connected to the other end of the sixth signal line whereas the second signal electrode is connected to the other end of the fifth signal line.

Description of other embodiments will be described below with reference to the drawings. In the drawings, the same reference numerals represent the same or similar portions.

Figure 2:
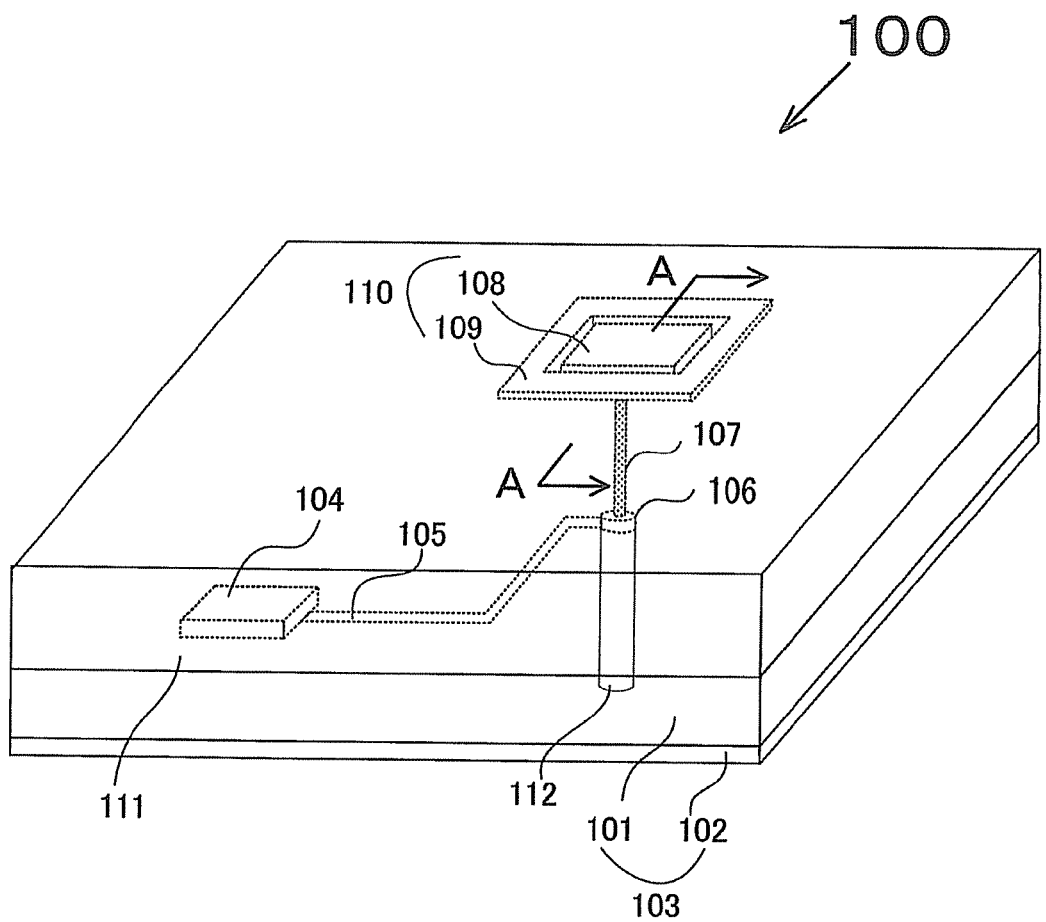
FIG. 2 is a diagram illustrating the configuration of a communication apparatus of the first embodiment.
Figure 3:
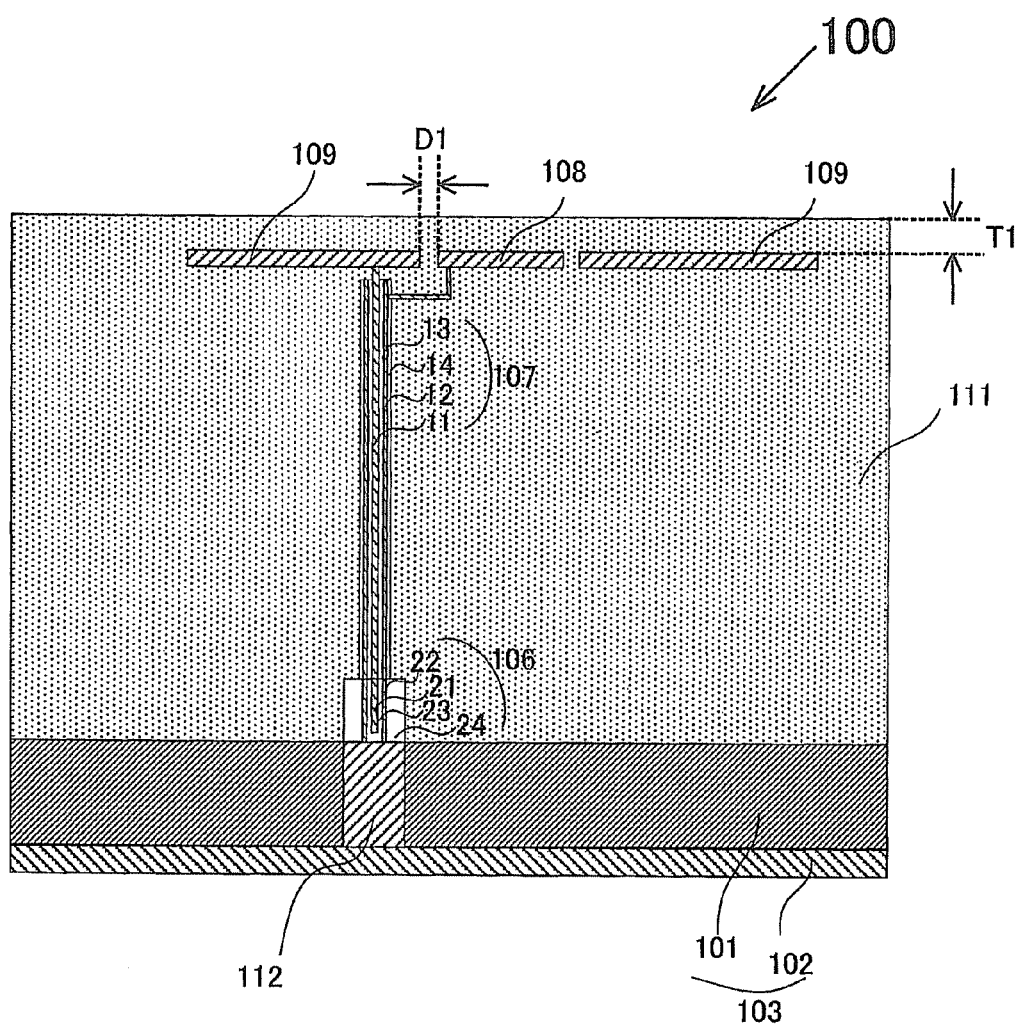
FIG. 3 is a schematic cross sectional view illustrating the communication apparatus taken along the line A-A of FIG. 2.

A communication apparatus and a communication system of a first embodiment will be described with reference to the relevant drawings. FIG. 1 is a diagram illustrating the configuration of the communication system. FIG. 2 is a diagram illustrating the configuration of the communication apparatus. FIG. 3 is a schematic cross sectional view illustrating the communication apparatus taken along the line A-A of FIG. 2. In the first embodiment, the communication quality is improved by providing a reference potential electrode in the central portion of an electrode unit of the communication apparatus, and by providing a signal electrode around the reference potential electrode so as to be put a distance between the reference potential electrode and the signal electrode.

As FIG. 1 shows, a communication system 1 includes a communication apparatus 100 and a communication apparatus 300. The communication system 1 performs wearable-computing communications by the electric field method between the communication apparatus 100 and the communication apparatus 300 through a living body such as a human body. In the communication system 1, when a communication unit 304 of the communication apparatus 300, for example, is used as a transmitter (Tx), the data is transmitted from the communication unit 304 to a communication unit 104 of the communication apparatus 100 by way of a coaxial line 307, an electrode unit 310, a living body 30 such as a human body, an electrode unit 110, and a coaxial line 107. That is, the communication unit 104 of the communication apparatus 100 serves as a receiver (Rx). If the communication unit 104 of the communication apparatus 100 is used as a transmitter (Tx), the communication unit 304 of the communication apparatus 300 serves as a receiver (Rx).

The above-mentioned electric-field method refers to a communication method by converting information to be sent into changes in the electric field caused along the surface of a living body such as a human body. It is necessary for a user to perform data communications between an electrode and a living body such as a human body in such manner that the living body holds a hand over the electrode. No direct contact between the living body and the electrode is necessary for this purpose. The range of communication frequencies (also referred to as the carrier frequencies) for the data communications is from several hundred of kilohertz to several tens of megahertz. The electric power needed for the data communications ranges from 1 to 10 mW. Accordingly, the electric power consumed by the electric-field communication method is one digit smaller than the electric power of the Bluetooth communication method and the ZigBee communication method.

Note that the living body 30 is assumed to be a human body in FIG. 1, but bodies of animals such as dogs and cats may serve as the living body 30 in place of human bodies.

As FIG. 2 shows, the communication apparatus 100 includes a substrate 103, the communication unit 104, a signal line 105, a terminal 106, the coaxial line 107, the electrode unit 110, a sealing material 111, and a via 112.

The substrate 103 includes a dielectric portion 101 and a ground electrode 102. The dielectric portion 101 is provided on a first main surface (front-side surface) of the ground electrode 102. The dielectric portion 101 is made of an insulating ceramics or an insulating organic material, for example. The ground electrode 102 is a layer of a metal such as copper (Cu) or gold (Au).

The communication unit 104 is provided on the first main surface of the dielectric portion 101, and performs the transmission and the reception of data. The signal line 105 is provided on the first main surface of the dielectric portion 101, and one end of the signal line 105 is connected to the communication unit 104. The terminal 106 is provided on the first main surface of the dielectric portion 101. The coaxial line 107 is provided at the first main surface side of the dielectric portion 101 (specifically, on the terminal 106).

The electrode unit 110 including a reference potential electrode 108 and a signal electrode 109 is provided on the coaxial line 107. The reference potential electrode 108 is provided in the central portion of the electrode unit 110, and has a quadrilateral shape (when viewed from right above). The signal electrode 109 has a distance from the reference potential electrode 108 and is provided around the reference potential electrode 108. Each of the outer perimeter portion and the inner perimeter portion of the signal electrode 109 has a quadrilateral shape (when viewed from right above).

The reference potential electrode 108 and the signal electrode 109 are formed on a single plane in FIG. 2, but these electrodes 108 and 109 may be formed on a single curved surface. The reference potential electrode 108, the outer perimeter portion of the signal electrode 109, and the inner perimeter portion of the signal electrode 109 may be respectively a polygonal shape having n corners (n is an integer of five or more), a circular shape, or an oval shape.

The communication unit 104, the signal line 105, the terminal 106, the coaxial line 107, and the electrode unit 110 are sealed with the sealing material 111. The sealing material 111 is made of an insulating resin, for example.

As FIG. 3 shows, the terminal 106 includes an inner signal line 21, an outer signal line 22, a dielectric layer 23, and a dielectric layer 24. The inner signal line 21 is provided in the central portion of the terminal 106, and is surrounded by the dielectric layer 23. The outer signal line 22 is provided around the inner signal line 21 through the dielectric layer 23 provided in between. In addition, the outer signal line 22 is surrounded by the dielectric layer 24. One end of the inner signal line 21 is connected to the other end of the signal line 105. One end of the outer signal line 22 is connected to the ground electrode 102 through the via 112.

The coaxial line 107 includes an inner signal line 11, an outer signal line 12, a dielectric layer 13, and a dielectric layer 14. The inner signal line 11 is provide in the central portion of the coaxial line 107, and is surrounded by the dielectric layer 13. The outer signal line 12 is provided around the inner signal line 11 through the dielectric layer 13 provided in between. In addition, the outer signal line 12 is surrounded by the dielectric layer. One end of the inner signal line 11 is connected to the other end of the inner signal line 21 of the terminal 106. One end of the outer signal line 12 is connected to the other end of the outer signal line 22 of the terminal 106.

The reference potential electrode 108 is provided on the coaxial line 107, and is connected to the other end of the outer signal line 12 of the coaxial line 107. The signal electrode 109 is provided around the reference potential electrode 108, and is separated away from the reference potential electrode 108 by a certain distance which will be referred to as an inter-electrode distance D1. The signal electrode 109 is connected to the second end of the inner signal line 11 of the coaxial line 107. The length of the outer perimeter portion of the signal electrode 109 is set to be equal to or smaller than a single wavelength of the communication frequency for the communication apparatus 100. Here, the reference potential electrode 108 and the signal electrode 109 of the electrode unit 110 are respectively provided in parallel with the substrate 103.

The sealing material 111 is provided around the terminal 106, the coaxial line 107, and the electrode unit 110. The thickness of the portion of the sealing material 111 that is provided on first main surfaces of the reference potential electrode 108 and the signal electrode 109 is set to be the thickness T1.

A first main surface of the sealing material 111 is the surface that the hand or the like of the living body such as a human body is in contact with, or the surface that the hand of the user is held over, when human body communication is performed. The relationship between the inter-electrode distance D1 and the thickness T1 of the sealing material 111 that is the dielectric layer is preferably set as follows:

$$D1 > T1 \qquad \text{formula (1)}$$

The configuration of the communication apparatus 300 is identical to the configuration of the communication apparatus 100 shown in FIGS. 2 and 3, and therefore will not be described.

Figure 4:
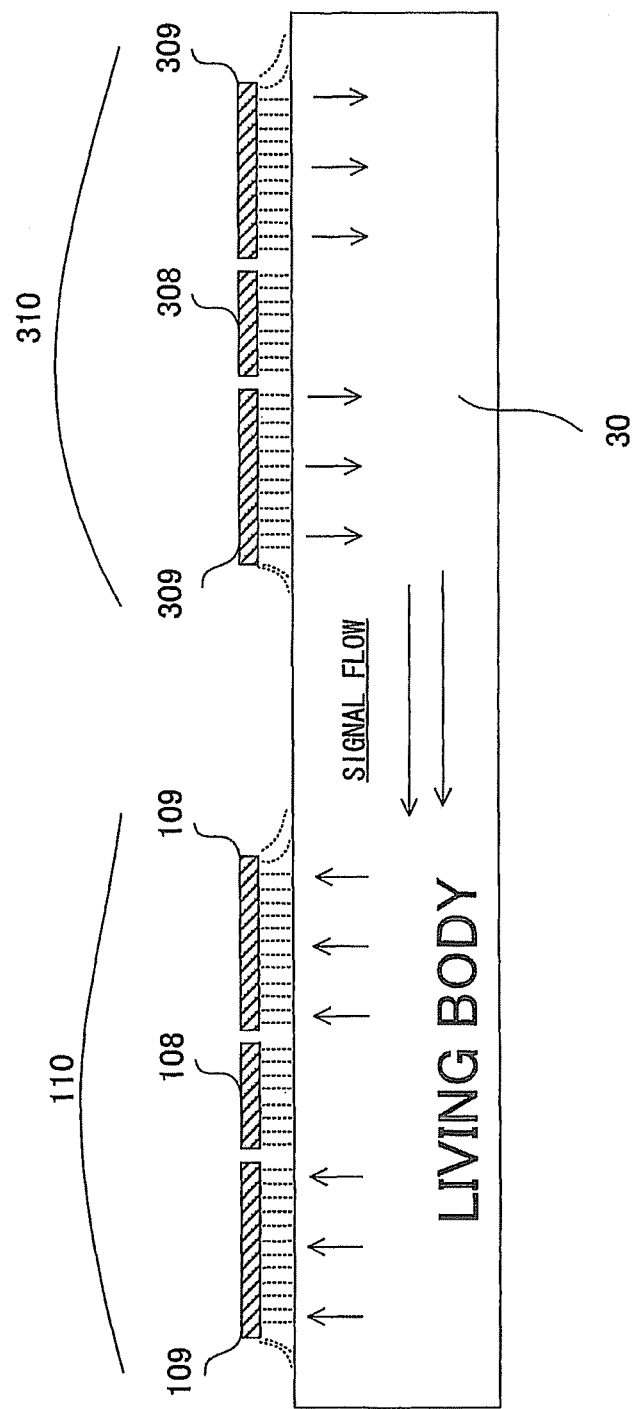
FIG. 4 is a diagram illustrating both a signal flow and electrostatic couplings between a living body and electrodes.
Figure 5:
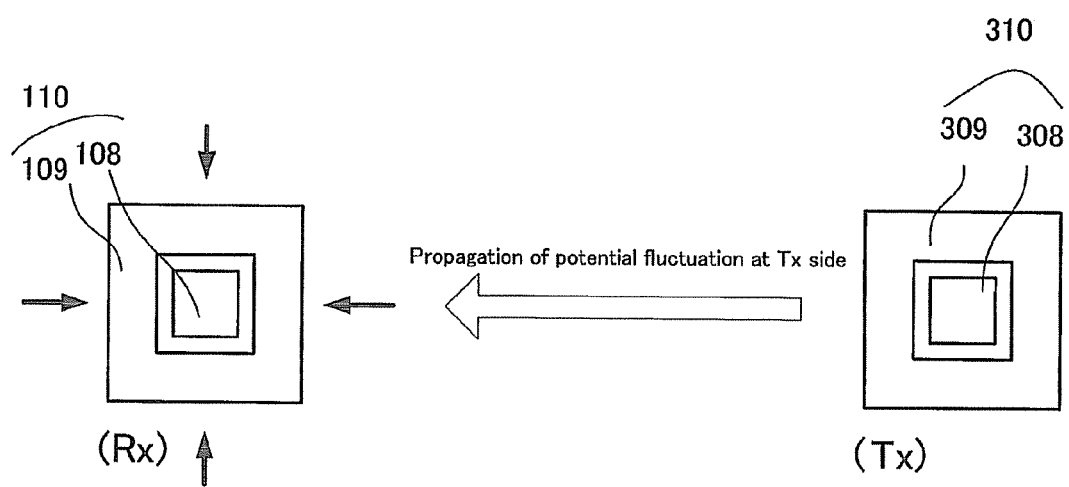
FIG. 5 is a diagram to describe how a signal is received by a signal electrode.

Next, the flow of a signal in the communication system will be described with reference to FIGS. 4 and 5. FIG. 4 is a diagram illustrating a signal flow and electrostatic couplings between a living body and electrodes. FIG. 5 is a diagram to describe the reception of a signal by a signal electrode. These drawings are based on an assumption that human body communication is performed by the living body 30 such as a human body that brings his/her hand into contact with or that holds his/her hand over the electrode units 110 and 310.

As FIG. 4 shows, the data (voltage signal) transmitted from a communication unit 304 (Tx side) is transferred through a coaxial line 307 and the like to a signal electrode 309 of the electrode unit 310. Once reaching the signal electrode 309, the signal is then propagated, as a voltage signal, to the living body 30 that is electrostatically coupled with the electrode unit 310. Note that the length of the outer perimeter portion of the signal electrode 309 is set equal to or smaller than a single wavelength of the communication frequency used by the communication apparatus 300.

Electrical charges move in the living body 30, and the data (voltage signal) are propagated to the side of the electrode unit 100 on the receiver (Rx) side.

On the receiver (Rx) side, the data (voltage signal) are transferred to the signal electrode 109 from the living body 30 that is electrostatically coupled with the electrode unit 110. The signal received by the signal electrode 109 is inputted into the communication unit 104 through the coaxial line 107.

As FIG. 5 shows, when the fluctuation of the potential on the surface of the living body 30 is occurred by the communication apparatus 300 to transmit a signal, the fluctuation in potential is propagated from the outside of the signal electrode 109 of the electrode unit 110. The fluctuation in potential is received by the signal electrode 109. The fluctuation in potential generated by the electrode 310 is blocked by the signal electrode 109, and is not propagated to the reference potential electrode 108, which is provided at the inner side of the signal electrode 109.

Accordingly, the potential of the reference potential electrode 108 is not fluctuated and is fixed at a potential that is inherent in the living body 30 such as a human body. The reference potential electrode 108 is connected to the ground electrode 102 by way of the coaxial line 107, the terminal 106, and the via 112. Accordingly, the reference potential electrode 108 has a potential that is equal to the potential of the ground electrode 102. For this reason, the reference potential of the communication apparatus 100 does not fluctuate and is kept stable.

When the communication unit 104 is used as the transmitter (Tx), the potential of the reference potential electrode 308 of the communication apparatus 300 is not fluctuated and is fixed at a potential that is inherent in the living body 30 such as a human body, likewise. The reference potential electrode 308 is connected to the ground electrode by way of the coaxial line 307, the terminal, and the via. Accordingly, the reference potential electrode 308 has a potential that is equal to the potential of the ground electrode. For this reason, the reference potential of the communication apparatus 300 does not fluctuate and is kept stable.

As described above, according to the communication apparatus and the communication system of the first embodiment, wearable-computing communications are performed by the electric-field method between the communication apparatus 100 and the communication apparatus 300 by way of the living body 30. The electrode unit 110 of the communication apparatus 100 includes the reference potential electrode 108 and the signal electrode 109. The reference potential electrode 108 is provided in the central portion of the electrode unit 110 whereas the signal electrode 109 is provided around the reference potential electrode 108 with a space left in between. The electrode unit 310 of the communication apparatus 300 includes the reference potential electrode 308 and the signal electrode 309. The reference potential electrode 308 is provided in the central portion of the electrode unit 310 whereas the signal electrode 309 is provided around the reference potential electrode 308 with a space left in between. Both of the reference potentials of the communication apparatuses 100 and 300 are equal to the potential inherent in the living body 30 such as a human body. Hence, it is not necessary to equalize the reference potentials of the two communication apparatus to each other, as in the conventional cases, by means of couplings provided by the earth ground and/or the atmosphere. Accordingly, the influence of noise from external systems can be reduced.

The receiving sensitivity is thus improved, and, as a consequence, the communication qualities of the communication apparatus 100, the communication apparatus 300, and the communication system 1 can be improved significantly.

Figure 13:
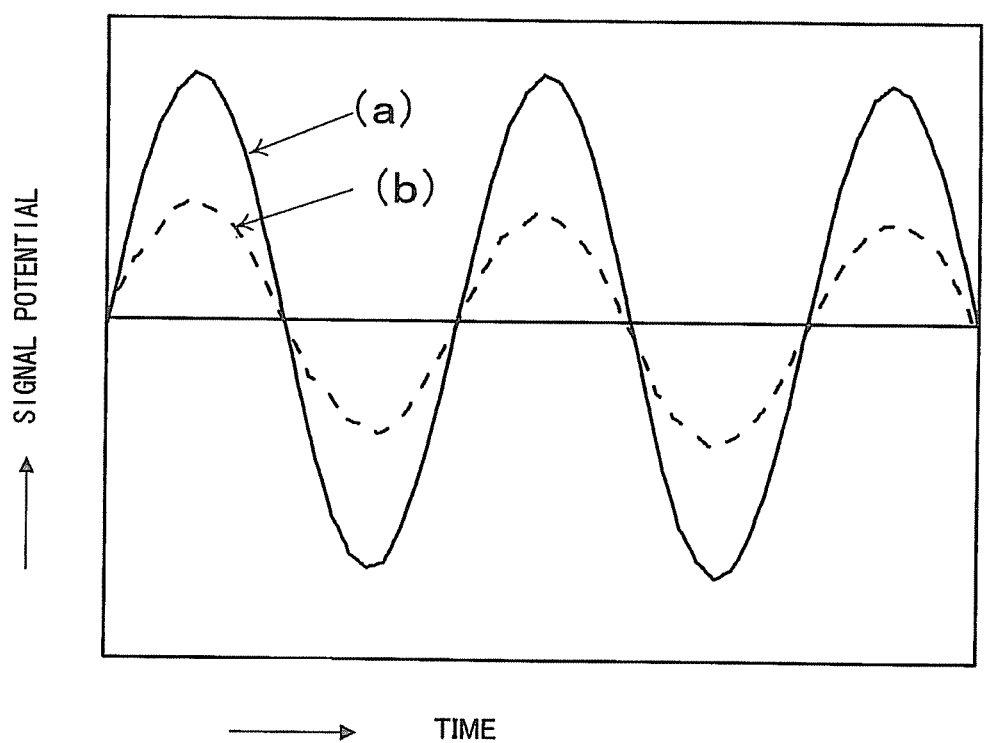
FIG. 13 is a diagram illustrating a reception signal of an electrode of the embodiment and that of a conventional electrode.

FIG. 13 shows the results of measuring the potentials of reception signals for the electrode of the first embodiment and for a conventional electrode. The electrode unit 110 of the conventional example includes only a quadrilateral signal electrode. The potential of the reception signal of the first embodiment is represented by the solid line (a) is twice stronger than the potential of the reception signal of the conventional case represented by the broken line (b). This reveals an improvement in communication quality achieved by the first embodiment.

Figure 6:
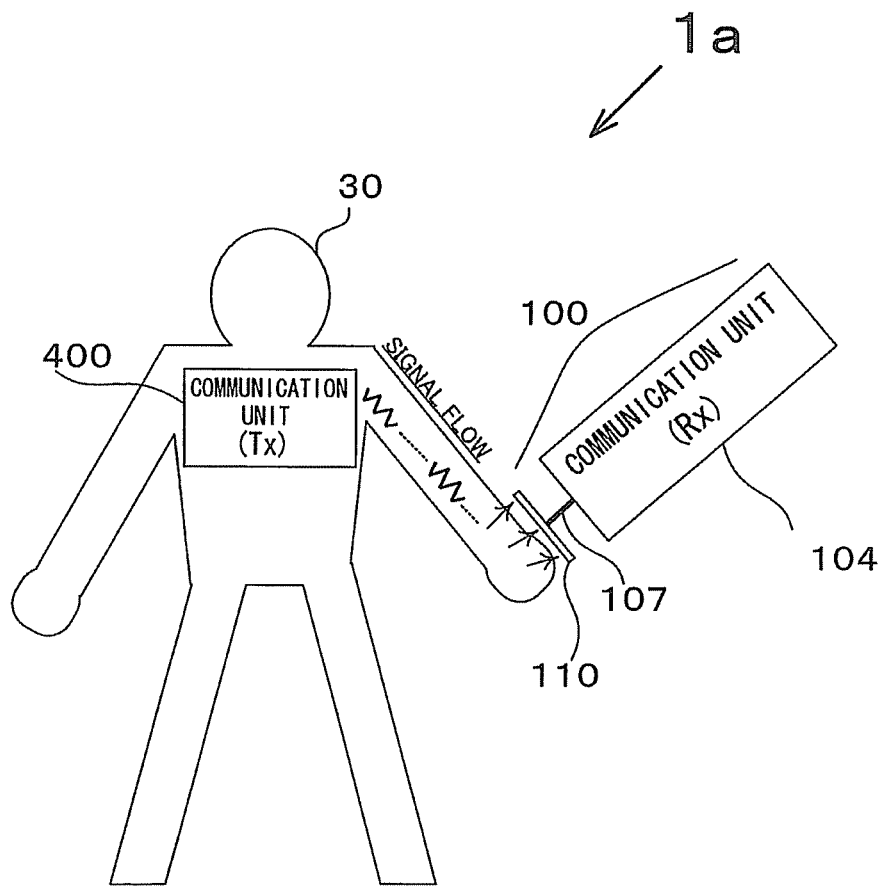
FIG. 6 is a diagram illustrating a communication system of a first modification.

An example of wearable-computing communications performed by use of the communication apparatuses 100 and 300 is described in the first embodiment, but the invention is not necessarily limited to such an example. For example, the invention is applicable also to a communication system 1a (first modification) shown in FIG. 6. In the case of the communication system 1a, data communications are performed by means of human body communication between a communication apparatus 100 and a communication apparatus 400 that is attached to a living body 30 to monitor health-management information, for example, of the living body 30. The communication apparatus 400 serves as a transmitter (Tx) whereas the communication apparatus 100 serves as a receiver (Rx).

Figure 7:
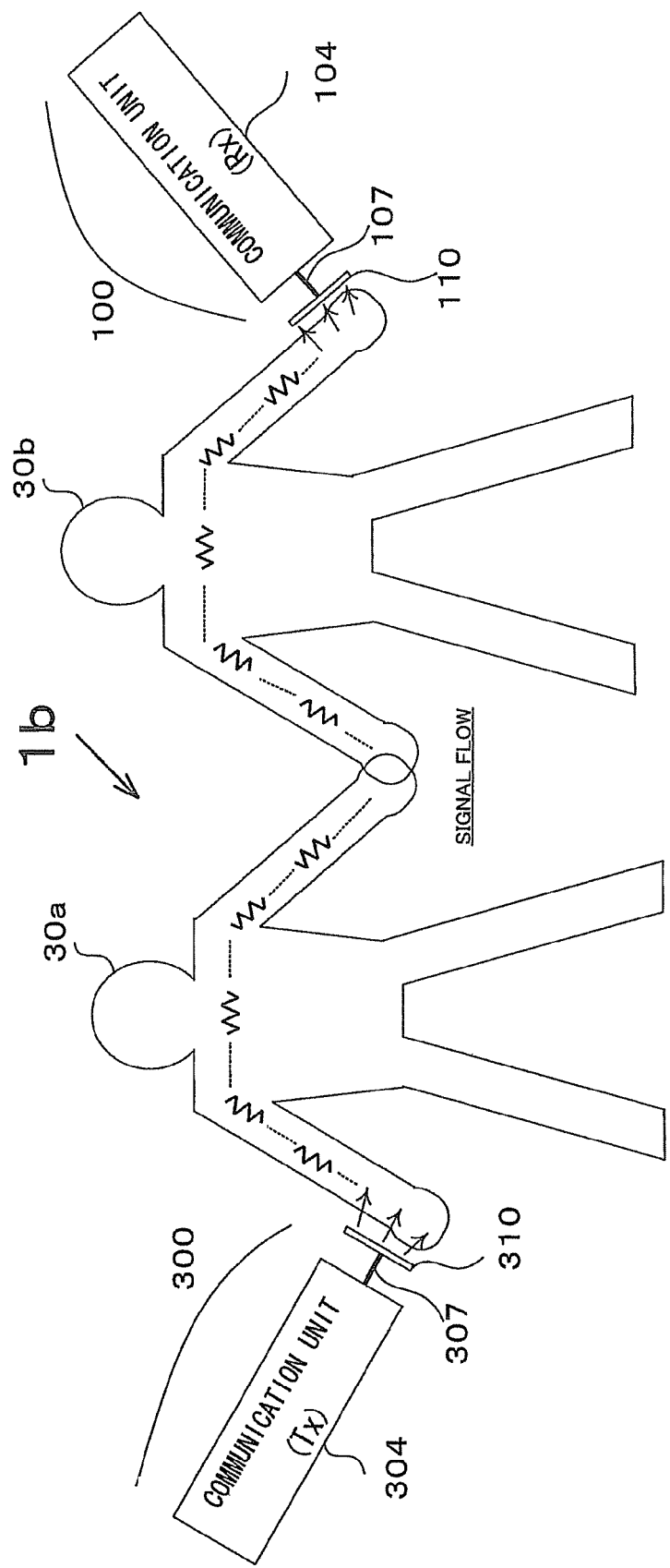
FIG. 7 is a diagram illustrating a communication system of a second modification.

The invention is also applicable to a communication system 1b (second modification) shown in FIG. 7. In the case of the communication system 1b, data communications are performed by means of human body communication between a communication apparatus 100 and a communication apparatus 300 through a living body 30a and a living body 30b holding hands with each other. For example, suppose a case where both of the communication apparatus 100 and 300 are PDAs (personal digital assistants). In this case, a communication unit 304 (Tx) of the communication apparatus 300 transmits information, by way of human body communication (through the living body 30a and then the living body 30b), to a communication unit 104 (Rx) of the communication apparatus 100. The information thus inputted into the communication unit 104 (Rx) is stored in the communication apparatus 100.

Figure 8:
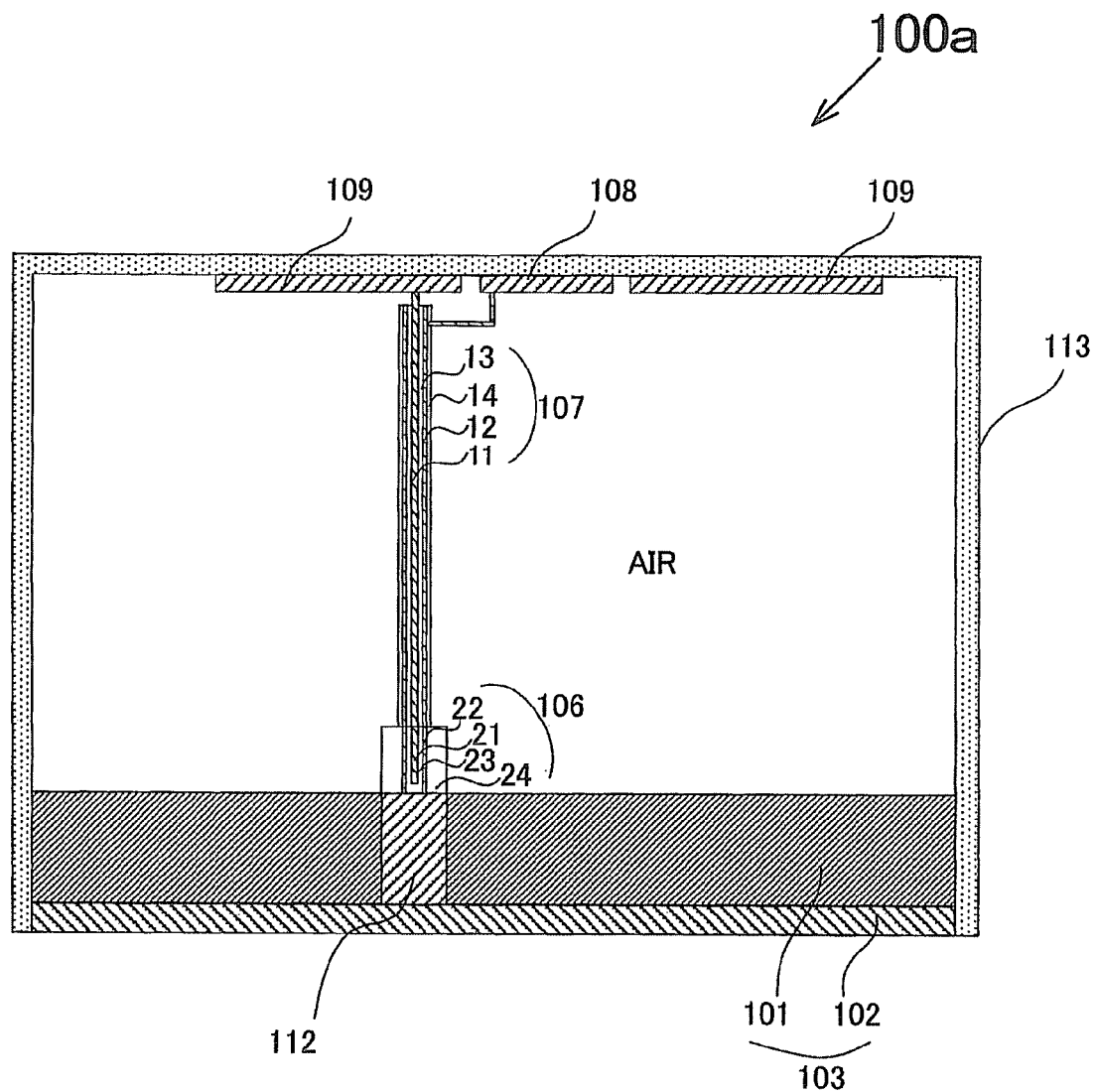
FIG. 8 is a diagram illustrating a communication apparatus of a third modification.

The invention is also applicable to a communication system 100a (third modification) shown in FIG. 8. In the communication apparatus 100a, a case 113 is used to cover a substrate 103, a terminal 106, a coaxial line 107, and an electrode unit 110. Air, for example, is filled in the space around the terminal 106, the coaxial line 107, and the electrode unit 110. Only the first main surface sides of a reference potential electrode 108 and a signal electrode 109 are in contact with the case 113.

Figure 9:
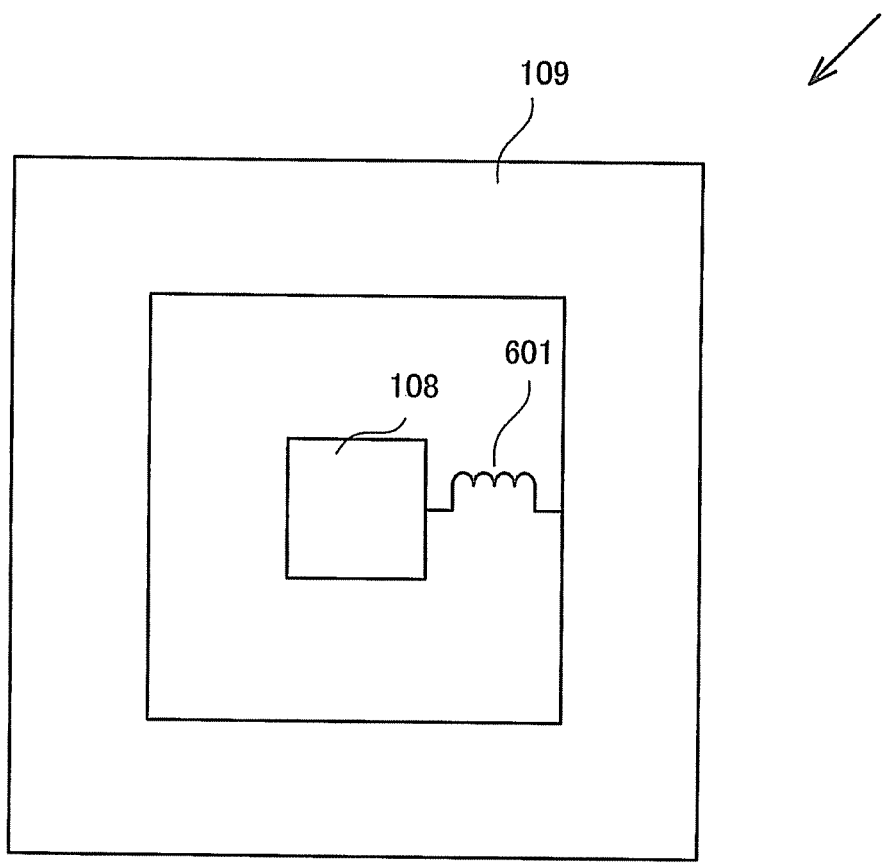
FIG. 9 is a diagram illustrating the configuration of an electrode unit of a second embodiment.

A communication apparatus of a second embodiment will be described with reference to the relevant drawing. FIG. 9 is a diagram illustrating the configuration of an electrode unit of the communication apparatus. In the second embodiment, a reference potential electrode and a signal electrode of the electrode unit are connected to each other by an inductor.

As FIG. 9 shows, an electrode unit 110a of the communication apparatus includes a reference potential electrode 108, a signal electrode 109, and an inductor 601. The reference potential electrode 108 is provided in the central portion of the electrode unit 110a, and has a quadrilateral shape (when viewed from right above). The signal electrode 109 is provided around the reference potential electrode 108 with a space in between. Each of the outer perimeter portion and the inner perimeter portion of the signal electrode 109 has a quadrilateral shape (when viewed from right above). One end of the inductor 601 is connected to the reference potential electrode 108 whereas the other end of the inductor 601 is connected to the signal electrode 109.

Here, the relationship between the electrical length L1 of the inductor 601 and the wavelength λ1 of the communication frequency (also referred to as the carrier frequency) used by the communication apparatus that performs human body communication is set as follows:

$$L1 = \lambda \cdot \tfrac{1}{4} \quad \text{formula (2)}$$

With this setting, the inductor 601 functions as a choke element. Accordingly, the isolation between the reference potential electrode 108 and the signal electrode 109 can be improved from that of the first embodiment.

As described above, the communication apparatus of the second embodiment includes the inductor 601. The one of the inductor 601 is connected to the reference potential electrode 108 whereas the other end of the inductor 601 is connected to the signal electrode 109. The electrical length of the inductor 601 is set to be equal to a quarter of the wavelength of the communication frequency for the communication apparatus.

Accordingly, the isolation between the reference potential electrode 108 and the signal electrode 109 is improved. Consequently, the communication quality of the communication apparatus can be improved significantly.

Figure 10:
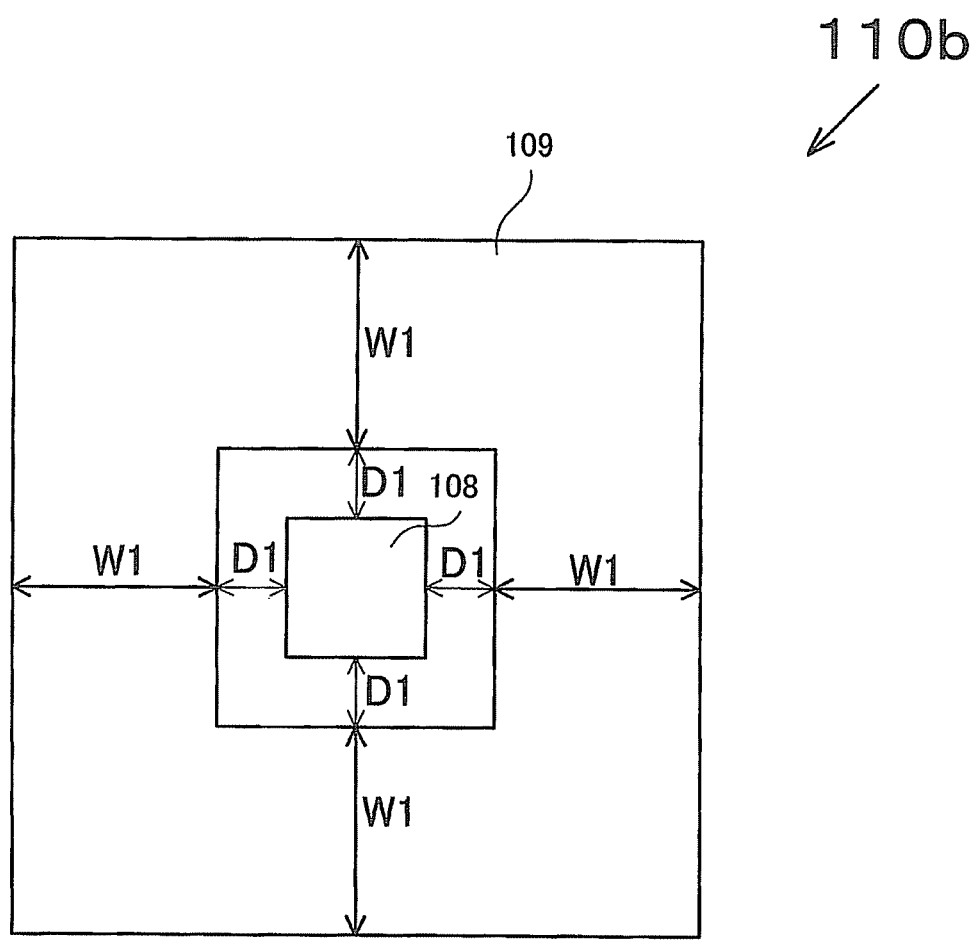
FIG. 10 is a diagram illustrating the configuration of an electrode unit of a third embodiment.

A communication apparatus of a third embodiment will be described with reference to the relevant drawing. FIG. 10 is a diagram illustrating the configuration of an electrode unit of the communication apparatus. In the third embodiment, the width of a signal electrode is set at a constant value (which is referred to as the electrode width).

As FIG. 10 shows, an electrode unit 110b of the communication apparatus includes a reference potential electrode 108 and a signal electrode 109. The reference potential electrode 108 is provided in the central portion of the electrode unit 110b, and has a quadrilateral shape (when viewed from right above). The signal electrode 109 is provided around the reference potential electrode 108, and is separated away from the reference potential electrode 108 by a certain distance (which will be referred to as an inter-electrode distance D1). Each of the outer perimeter portion and the inner perimeter portion of the signal electrode 109 has a quadrilateral shape (when viewed from right above). Each of the dimensions, measured both in the up-and-down and side-to-side directions, of the signal electrode 109 is set at a constant electrode width W1.

When the communication apparatus performing human body communication is used by different users (living bodies 30), the condition of contact between the living body 30 and the electrode unit 110b differs from one user to another. For example, some users (living bodies 30) use the communication apparatus with the signal electrode 109 partially noncontacted by the living body 30. In this case, when the width of the signal electrode 109 has a narrow position and a wide position, a big difference in the signal receiving sensitivity appears by the difference of the position touched the electrode unit. Accordingly, data communications cannot be performed in the case that a user (living body 30) holds the communication apparatus in a particular way.

In the third embodiment, the signal electrode 109 is separated from the reference potential electrode 108 by the inter-electrode distance D1, and each of the dimensions, measured both in the up-and-down and side-to-side directions, of the signal electrode 109 is set at the constant electrode width W1.

Accordingly, the communication apparatus of the third embodiment reduces the difference in signal receiving sensitivity caused by the position where the user touches the electrode unit 110b. Consequently, constant communication performance can be secured irrespective of who the user is or how the user holds the communication apparatus.

Figure 11:
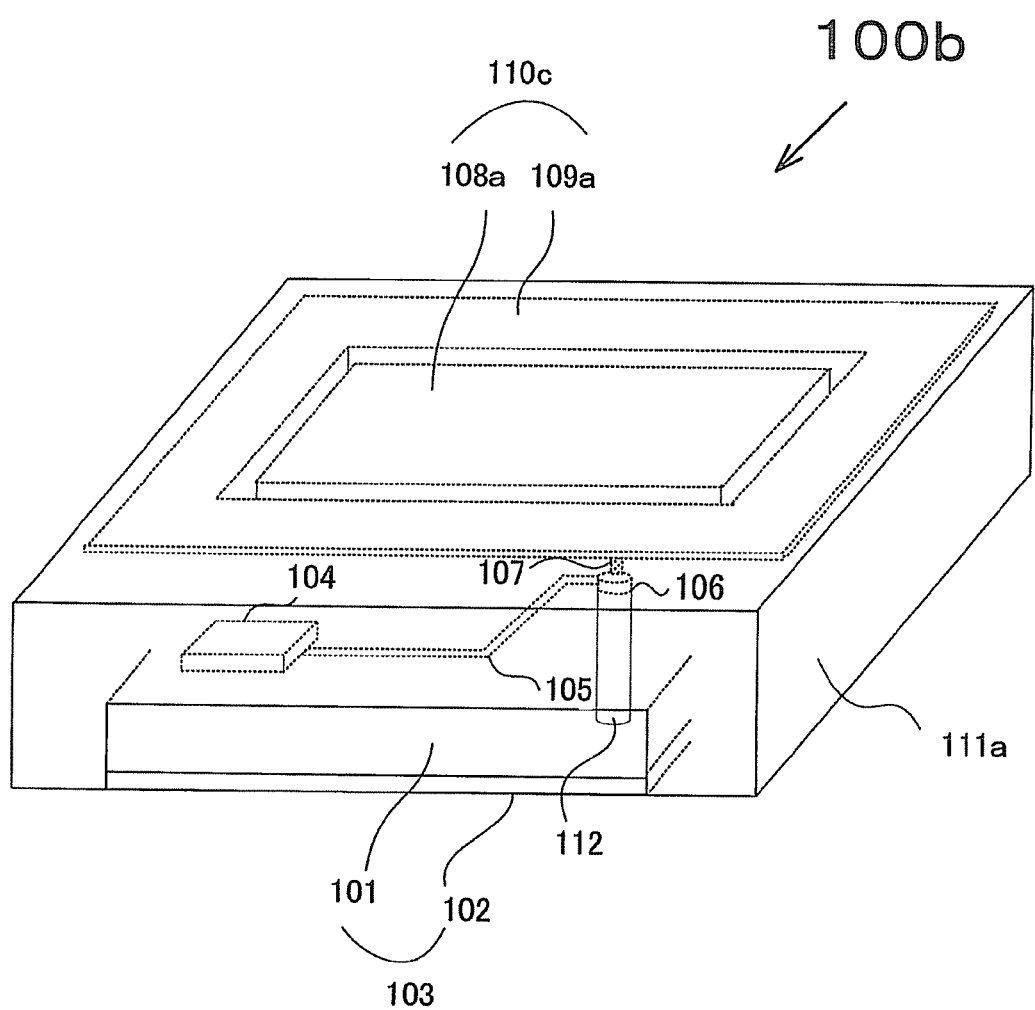
FIG. 11 is a diagram illustrating the configuration of a communication apparatus of a fourth embodiment.

A communication apparatus of a fourth embodiment will be described with reference to the relevant drawing. FIG. 11 is a diagram illustrating the configuration of the communication apparatus. In the fourth embodiment, an electrode unit has a larger area than that of a ground electrode and the ground electrode is prevented from facing any surface of a living body.

In the following description, those constituent portions that are identical to their respective counterparts in the first embodiment are denoted by the same reference numerals used in the first embodiment. No description of the identical portions will be given. Only the different portions will be described below.

As FIG. 11 shows, a communication apparatus 100b includes a substrate 103, a communication unit 104, a signal line 105, a terminal 106, a coaxial line 107, an electrode unit 110c, a sealing material 111a, and a via 112.

The electrode unit 110c including a reference potential electrode 108a and a signal electrode 109a is provided on the coaxial line 107. The area of the electrode unit 110c is set to be larger than the area of the substrate 103. A ground electrode 102 of the substrate 103 does not face any surface of a living body 30 such as a human body.

The reference potential electrode 108a is provided in the central portion of the electrode unit 110c, and has a quadrilateral shape (when viewed from right above). The signal electrode 109a is provided around the reference potential electrode 108a with a space left in between. Each of the outer perimeter portion and the inner perimeter portion of the signal electrode 109a has a quadrilateral shape (when viewed from right above). Here, the reference potential electrode 108a and the signal electrode 109a are formed on a single plane in FIG. 11, but these electrodes 108a and 109a may be formed on a single curved surface.

The substrate 103, the communication unit 104, the signal line 105, the terminal 106, the coaxial line 107, and the electrode unit 110c are sealed with the sealing material 111a. The bottom-surface portion of ground electrode 102 of the substrate 103 is exposed outside without being sealed with the sealing material 111c.

Here, when the ground electrode 102 is made larger than the area of the electrode unit 100b and faces a surface of the living body 30 such as a human body, the living body 30 may be electrostatically coupled with the ground electrode 102 that receives the signal. In this case, the reference potential of the communication apparatus 100b becomes unstable, and the signal receiving sensitivity is impaired.

According to the communication apparatus 100b of the fourth embodiment, the ground electrode 102 faces none of the surfaces of the living body 30 such as a human body. The ground electrode 102 receives no signals. The reference potential of the communication apparatus 100 becomes stable, and the signal receiving sensitivity is improved. Consequently, the communication quality of the communication apparatus 100b can be improved significantly.

Figure 12:
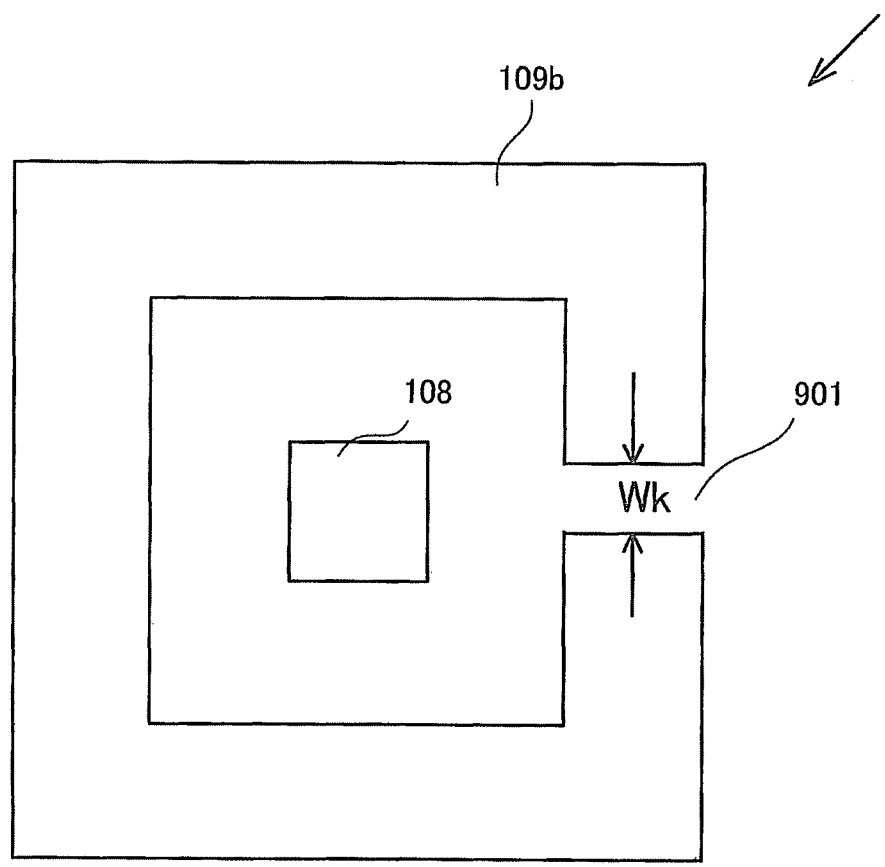
FIG. 12 is a diagram illustrating the configuration of an electrode unit of a fifth embodiment.

A communication apparatus of a fifth embodiment will be described with reference to the relevant drawing. FIG. 12 is a diagram illustrating the configuration of an electrode unit of the communication apparatus. In the fifth embodiment, a cutting portion is formed in a signal electrode of the electrode unit.

As FIG. 12 shows, an electrode unit 110d of the communication apparatus includes a reference potential electrode 108 and a signal electrode 109b. The reference potential electrode 108 is provided in the central portion of the electrode unit 110d, and has a quadrilateral shape (when viewed from right above). The signal electrode 109b is provided around the reference potential electrode 108 with a space in between. The signal electrode 109b includes a cutting portion 901 with a cutting width Wk on the right side in FIG. 12.

Here, when the cutting portion 901 is formed in the signal electrode 109b, a side of the signal electrode 109b is physically cut. However, the capacity coupling leaves the signal electrode 109b electrically connected. The signal electrode 109b continues to incorporate electrically the reference potential electrode 108, and keeps the reference potential electrode 108 stable.

When the electrode unit 110d is provided along a curved surface of the case, it is very difficult to mount parts for an operation of the apparatus on the curved surface of the case.

The communication apparatus according to the fifth embodiment allows parts, for the operation of the apparatus, to be mounted on the curved surface of the case by forming the cutting portion 901 in the signal electrode 109b. Accordingly, the mounting of parts on the communication apparatus becomes easier.

The invention is not limited to the above-described embodiments. Rather various modifications may be made without departing from the gist of the invention.

For example, in the first embodiment, the signal line 105 is connected to the inner signal line 11 of the coaxial line 107 through the terminal 106, the via 112 is connected to the outer signal line 12 of the coaxial line 107 through the terminal 106. The use of the terminal 106 is not the only way of connecting these portions. Direct connections without the terminal 106 are also allowable.

Also in the embodiment, wearable-computing communications are performed by way of the living bodies 30a and 30b. This is not the only way of performing wearable-computing communications. Wearable-computing communications can be performed by way of three or more living bodies that hold hands with one another.

While certain embodiments have been described, these embodiments have been presented by way of example only, and are not intend to limit the scope of the inventions. Indeed, the novel embodiments described herein may be embodied in a variety of the other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication apparatus, comprising:
a substrate including a ground electrode;
a communication unit provided on a first main surface of the substrate;
a first signal line provided on the first main surface of the substrate, the first signal line having one end connected to the communication unit;
a coaxial line provided at a first main surface side of the substrate, the coaxial line including a second signal line and a third signal line, the third signal line provided at an outside of the second signal line through a dielectric, the second signal line having one end connected to the other end of the first signal line, the third signal line having one end connected to the ground electrode through a via; and
an electrode unit including a reference potential electrode and a signal electrode, the signal electrode having a distance from the reference potential electrode and provided around the reference potential electrode, the reference potential electrode connected to the other end of the third signal line, the signal electrode connected to the other end of the second signal line,
wherein data communications are performed by use of an electrostatic coupling formed between the electrode unit and a living body.

2. The communication apparatus according to claim 1, wherein the signal electrode has an outer-perimeter length that is equal to or smaller than a single wavelength of a communication frequency.

3. The communication apparatus according to claim 1, further comprising:

an inductor having one end connected to the reference potential electrode and the other end connected to the signal electrode, wherein the inductor has an electrical length set to be a quarter of a wavelength of a communication frequency.

4. The communication apparatus according to claim 1, wherein a cutting portion is provided in the signal electrode.

5. The communication apparatus according to claim 1, wherein the signal electrode is formed to have a constant electrode width.

6. The communication apparatus according to claim 1, wherein the reference potential electrode and the signal electrode are formed to be flush with each other.

7. The communication apparatus according to claim 1, wherein an outer perimeter of the signal electrode, an inner perimeter of the signal electrode, and the reference potential electrode are in any of a polygonal shape having n corners (n is an integer of four or more), a circular shape, and an oval shape.

8. The communication apparatus according to claim 1, wherein the electrode unit has an area set to be larger than an area of the ground electrode.

9. The communication apparatus according to claim 1, wherein the communication unit, the first signal line, the coaxial line, and the electrode unit are sealed with a sealing material, a thickness of the sealing material on the reference potential electrode is set to be the same as a thickness of the sealing material on the signal electrode.

10. The communication apparatus according to claim 1, further comprising:
a case covering the communication unit, the first signal line, the coaxial line, and the electrode unit,
wherein a first main surface of the reference potential electrode and a first main surface of the signal electrode are in contact with the case.

11. A communication apparatus, comprising:
a substrate including a ground electrode;
a communication unit provided on a first main surface of the substrate;
a first signal line provided on the first main surface of the substrate, the first signal line having a first end connected to the communication unit;
a terminal provided on a first main surface of the substrate, the terminal including a second signal line and a third signal line, the second signal line having one end connected to the other end of the first signal line, the third signal line having one end connected to the ground electrode through a via;
a coaxial line provided at the first main surface side of the substrate, the coaxial line including a fourth signal line and a fifth signal line, the fifth signal line provided at an outside of the fourth signal line through a dielectric, the fourth signal line having one end connected to the other end of the second signal line, the fifth signal line having one end connected to the other end of the third signal line; and
an electrode unit including a reference potential electrode and a signal electrode, the signal electrode having a distance from the reference potential electrode and provided around the reference potential electrode, the reference potential electrode connected to the other end of the fifth signal line, the signal electrode connected to the other end of the fourth signal line,
wherein data communications are performed by use of an electrostatic coupling formed between the electrode unit and a living body.

12. The communication apparatus according to claim 11, wherein the signal electrode has an outer-perimeter length that is equal to or smaller than a single wavelength of a communication frequency.

13. The communication apparatus according to claim 11, further comprising:
an inductor having one end connected to the reference potential electrode and the other end connected to the signal electrode,
wherein the inductor has an electrical length set to be a quarter of a wavelength of a communication frequency.

14. The communication apparatus according to claim 11 wherein a cutting portion is provided in the signal electrode.

15. A communication system, comprising:
a first communication apparatus; and
a second communication apparatus,
wherein the first and second communication apparatuses perform data communications by use of an electric field formed by a living body,
the first communication apparatus including:
a first substrate having a first ground electrode;
a first communication unit provided on a first main surface of the first substrate, the first communication unit configured to transmit data;
a first signal line provided on the first main surface of the first substrate, the first signal line having one end connected to the first communication unit;
a first coaxial line provided at a first main surface side of the first substrate, the first coaxial line including a second signal line and a third signal line, the third signal line provided at an outside of the second signal line through a dielectric, the second signal line having one end connected to the other end of the first signal line, the third signal line having one end connected to the first ground electrode through a via; and
a first electrode unit having a first reference potential electrode and a first signal electrode, the first signal electrode having a distance from the first reference potential electrode and provided around the first reference potential electrode, the first reference potential electrode connected to the other end of the third signal line, and the first signal electrode connected to the other end of the second signal line, and
the second communication apparatus including:
a second substrate having a second ground electrode;
a second communication unit provided on a first main surface of the second substrate, the second communication unit configured to receive data;
a fourth signal line provided on the first main surface of the second substrate, the fourth signal line having one end connected to the second communication unit;
a second coaxial line provided at a first main surface side of the second substrate, the second coaxial line including a fifth signal line and a sixth signal line, the sixth signal line provided at an outside of the fifth signal line through a dielectric, the fifth signal line having one end connected to the other end of the fourth signal line, the sixth signal line having one end connected to the second ground electrode through a via; and
a second electrode unit having a second reference potential electrode and a second signal electrode, the second signal electrode having a distance from the second reference potential electrode and provided around the second reference potential electrode, the second reference potential electrode connected to the other end of the sixth signal line, the second signal electrode connected to the other end of the fifth signal line.

16. The communication system according to claim 15, wherein each of the first and second signal electrodes has an outer-perimeter length that is equal to or smaller than a single wavelength of a communication frequency.

17. The communication system according to claim 15,
wherein the first communication apparatus further includes a first inductor having one end connected to the first reference potential electrode and the other end connected to the first signal electrode,
the second communication apparatus further includes a second inductor having one end connected to the second reference potential electrode and the other end connected to the second signal electrode, and
each of the first and the second inductors has an electrical length set to be a quarter of a wavelength of a communication frequency.

18. The communication system according to claim 15, wherein a cutting portion is provided in each of the first and second signal electrodes.

19. The communication system according to claim 15, wherein the first communication apparatus is equipped with a human body, and transmits data to the second communication apparatus through the human body.

20. The communication system according to claim 15, wherein the first communication apparatus transmits data to the second communication apparatus through a plurality of human bodies holding hands with one another.

\* \* \* \* \*